(12) United States Patent
Nishii

(10) Patent No.: US 12,242,268 B2
(45) Date of Patent: Mar. 4, 2025

(54) TRAVEL ROUTE DETERMINATION SYSTEM

(71) Applicant: Yanmar Power Technology Co., Ltd., Osaka (JP)

(72) Inventor: Yasuto Nishii, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 18/140,585

(22) Filed: Apr. 27, 2023

(65) Prior Publication Data

US 2023/0266758 A1 Aug. 24, 2023

Related U.S. Application Data

(63) Continuation of application No. 17/511,603, filed on Oct. 27, 2021, now Pat. No. 11,675,352, which is a continuation of application No. 16/490,436, filed as application No. PCT/JP2018/001575 on Jan. 19, 2018, now Pat. No. 11,181,912.

(30) Foreign Application Priority Data

Mar. 3, 2017 (JP) .................................. 2017-040432

(51) Int. Cl.
*G05D 1/00* (2024.01)

(52) U.S. Cl.
CPC .......... *G05D 1/0088* (2013.01); *G05D 1/0212* (2013.01); *G05D 1/0268* (2013.01)

(58) Field of Classification Search
CPC .... G05D 1/0088; G05D 1/0212; G05D 1/268; G05D 2201/0213

USPC ........................................................... 701/23
See application file for complete search history.

(56) References Cited

U.S. PATENT DOCUMENTS

| | | | | |
|---|---|---|---|---|
| 9,763,377 | B2* | 9/2017 | Yokoyama | G05D 1/0278 |
| 9,841,768 | B2* | 12/2017 | Hiramatsu | A01D 75/185 |
| 10,191,492 | B2* | 1/2019 | Ogura | A01B 69/008 |
| 10,198,010 | B2* | 2/2019 | Hiramatsu | G05D 1/0287 |
| 10,274,963 | B2* | 4/2019 | Fukuda | A01B 69/00 |
| 2005/0075784 | A1* | 4/2005 | Gray | G05D 1/0212 701/25 |
| 2016/0169679 | A1* | 6/2016 | Kajino | G01S 19/42 701/491 |
| 2016/0265922 | A1* | 9/2016 | Thakur | G05D 1/0212 |
| 2017/0131718 | A1* | 5/2017 | Matsumura | G05D 1/02 |

(Continued)

*Primary Examiner* — Yazan A Soofi
(74) *Attorney, Agent, or Firm* — Chris Mizumoto

(57) ABSTRACT

A travel route determination system including: a route generating unit generating planned travel routes including work routes along which a work vehicle performs autonomous travel; a control unit capable of causing the work vehicle to perform autonomous travel along the planned travel routes; an information obtaining unit obtaining position information and orientation information on the work vehicle; and a determination unit determining an autonomous travel candidate route at which the work vehicle can start autonomous travel, before the work vehicle starts autonomous travel. The determination unit sets a candidate determination region based on the position information and orientation information on the work vehicle, and the determination unit determines, among the work routes, a work route in the candidate determination region as the autonomous travel candidate route.

4 Claims, 6 Drawing Sheets

(56) References Cited

U.S. PATENT DOCUMENTS

2017/0177002 A1\* 6/2017 Ogura ................. G05D 1/0295
2019/0186922 A1\* 6/2019 Shinkai ............... G05D 1/0212
2019/0227561 A1\* 7/2019 Hiramatsu ............ G05D 1/027

\* cited by examiner

TRAVEL ROUTE DETERMINATION SYSTEM

CROSS REFERENCES TO RELATED APPLICATIONS

This application is a continuation of U.S. application Ser. No. 17/511,603, filed on Oct. 27, 2021, which is a continuation of a national stage application, U.S. Ser. No. 16/490,436, filed on Aug. 30, 2019, pursuant to 35 U.S.C. § 371 of International Application No. PCT/JP2018/001575, filed on Jan. 19, 2018 which claims priority under 35 U.S.C. § 119 to Japanese Patent Application No. 2017-040432 filed on Mar. 3, 2017, all the disclosures of which are hereby incorporated by reference in their entirety.

TECHNICAL FIELD

The present invention relates to a travel route determination system for determining a planned travel route at which a work vehicle starts autonomous travel, in a case where the work vehicle is caused to perform autonomous travel.

BACKGROUND ART

A travel route determination system as those described above is used in an autonomous travel system configured to cause a work vehicle to perform autonomous travel (see, e.g., Patent Literature 1 (hereinafter, referred to as PTL 1)). A system described in PTL 1 generates planned travel routes including a plurality of work routes in a work region and causes a work vehicle to perform autonomous travel along the planned travel routes. According to this system, among the plurality of work routes, a start route to start autonomous travel is preliminarily set. Thus, the work vehicle is caused to move to the start end of the start route and start autonomous travel along the start route. In this manner, autonomous travel is started.

CITATION LIST

Patent Literature

PTL 1: PCT International Publication No. WO2015/119265

SUMMARY OF INVENTION

Technical Problem

According to the system described in PTL 1, among the plurality of work routes, the start route to start autonomous travel is preliminarily set. Therefore, for example, when the current position of the work vehicle is far away from the start route, the work vehicle needs to be moved to the start end of the start route. Consequently, it takes long time until autonomous travel is started.

In addition, according to the system described in PTL 1, autonomous travel cannot be started at any work route other than the start route that is preliminarily set. Thus, the system described in PTL 1 does not have flexibility in selection of the start route to start autonomous travel, and therefore cannot respond to a demand to start autonomous travel at a work route other than the start route.

In view of the actual circumstances described above, a main object of some aspects of the present invention is to provide a travel route determination system capable of flexibly determining a start route to start autonomous travel.

Solution to Problem and Advantageous Effects of Invention

According to a first aspect of the present invention, a travel route determination system includes:
 a route generating unit configured to generate planned travel routes including a plurality of work routes along which a work vehicle is caused to perform autonomous travel;
 a control unit capable of causing the work vehicle to perform autonomous travel along each of the planned travel routes;
 an information obtaining unit configured to obtain position information and orientation information on the work vehicle; and
 a determination unit configured to determine an autonomous travel candidate route at which the work vehicle is allowed to start autonomous travel, before the work vehicle starts autonomous travel, wherein
 the determination unit sets a candidate determination region based on the position information and the orientation information on the work vehicle, and the determination unit determines, as the autonomous travel candidate route, a work route included in the candidate determination region from among the plurality of work routes.

With the configuration described above, the determination unit sets the candidate determination region based on the position information and the orientation information on the work vehicle. Thus, it is possible to set, as the candidate determination region, a region including a work route suitable to start autonomous travel, such as a region that is close to the work vehicle in a traveling direction of the work vehicle, for example. In addition, the determination unit can determine, as an autonomous travel candidate route, a work route included in the candidate determination region from among the plurality of work routes. Namely, it is possible to determine an autonomous travel candidate route(s) from among the plurality of work routes including a work route suitable to start autonomous travel. Thus, the start route to start autonomous travel can be selected from among the autonomous travel candidate route(s). Consequently, for example, the work route being close to the work vehicle in the traveling direction of the work vehicle can be set as the start route, and autonomous travel can be started at the start route. In this manner, based on the position information and the orientation information on the work vehicle, it is possible to suitably determine the start route to start autonomous travel. Namely, it is possible to flexibly determine the start route and start autonomous travel at the start route thus determined.

According to a second aspect of the present invention, the determination unit does not determine, as the autonomous travel candidate route, a work route being included in the candidate determination region but meeting an exclusion condition.

With the configuration described above, the determination unit does not necessarily determine, as an autonomous travel candidate route, any work route included in the candidate determination region. Specifically, the determination unit does not determine, as an autonomous travel candidate route, a work route being included in the candidate determination region but meeting an exclusion condition. Thus, for example, in a case where a work route not suitable to start autonomous travel, such as a work route whose start end is apart from the work vehicle across an obstacle, is included in the candidate determination region, the determination unit can perform the determination on the autonomous travel candidate route while eliminating such an unsuitable work route. Consequently, it is possible to appropriately determine, as an autonomous travel candidate route, a work route suitable to start autonomous travel.

According to a third aspect of the present invention, in a case where the plurality of work routes does not include a work route included in the candidate determination region, the determination unit determines whether or not each of the work routes is suitable as the autonomous travel candidate route based on an angle made by a first straight line and a second straight line, the first straight line being defined by the position information on the work vehicle and by information on a start end of said each of the work routes, the second straight line extending along said each of the work routes.

With the configuration described above, the determination unit can perform the determination on the autonomous travel candidate route based on the angle made by the first straight line and the second straight line, namely, with use of the position information on the work vehicle. Consequently, even in a case where a work route included in the candidate determination region does not exist, it is possible to appropriately determine the autonomous travel candidate route.

According to a fourth aspect of the present invention, the travel route determination system further includes
  a specific region setting unit configured to set a specific region in which the work vehicle is caused to perform autonomous travel, wherein
  the specific region includes a first region where the planned travel routes are generated and a second region where the planned travel routes are not generated, and
  in a case where the work vehicle is located in the second region, the determination unit does not perform the determination on the autonomous travel candidate route based on the angle made by the first straight line and the second straight line, but still performs the determination on the autonomous travel candidate route based on the candidate determination region.

The configuration described above deals with the following matter. That is, in a case where the work vehicle is located in the second region, in which the planned travel routes are not generated, if the determination unit performs the determination on the autonomous travel candidate route based on the angle made by the first straight line and the second straight line, the determination unit may potentially determine, as an autonomous travel candidate route, a work route not suitable to start autonomous travel. In order to avoid this, in the case where the work vehicle is located in the second region, the determination unit does not perform the determination on the autonomous travel candidate route based on the angle made by the first straight line and the second straight line, but still performs the determination on the work route based on the candidate determination region until a work route enters the candidate determination region. Consequently, when a work route enters the candidate determination region, the determination unit can determine the work route as the autonomous travel candidate route. Thus, even in the case where the work vehicle is located in the second region, it is possible to appropriately determine a work route suitable to start autonomous travel as the autonomous travel candidate route.

DESCRIPTION OF EMBODIMENTS

With reference to the drawings, the following will describe an embodiment of an autonomous travel system including a travel route determination system according to the present invention.

Figure 1:
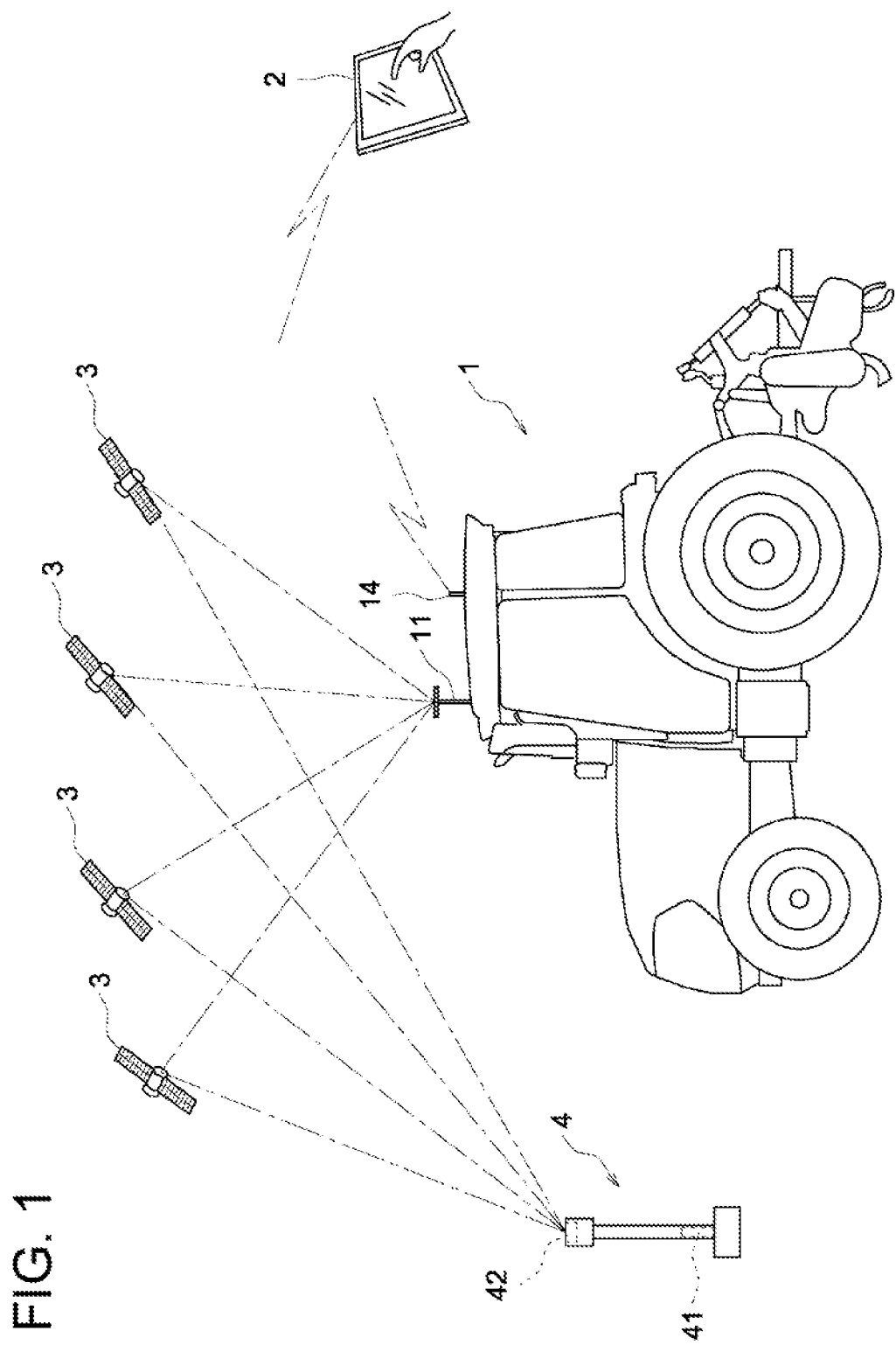
FIG. 1 A view illustrating a schematic configuration of an autonomous travel system.

As illustrated in FIG. 1, the autonomous travel system includes a tractor 1 that is a work vehicle configured to perform autonomous travel along autonomous travel routes (corresponding to planned travel routes) and a radio communication terminal 2 with which instructions regarding various kinds of information can be given to the tractor 1. In the present embodiment, the autonomous travel system includes a reference station 4 from which position information on the tractor 1 is obtained.

FIG. 1 shows the tractor 1 as one example of the work vehicle. Instead of the tractor, the work vehicle may be a riding-type working machine such as a rice transplanter, a combine harvester, a civil engineering and construction work machine, and a snowplow, or a walking-type work machine.

Figure 2:
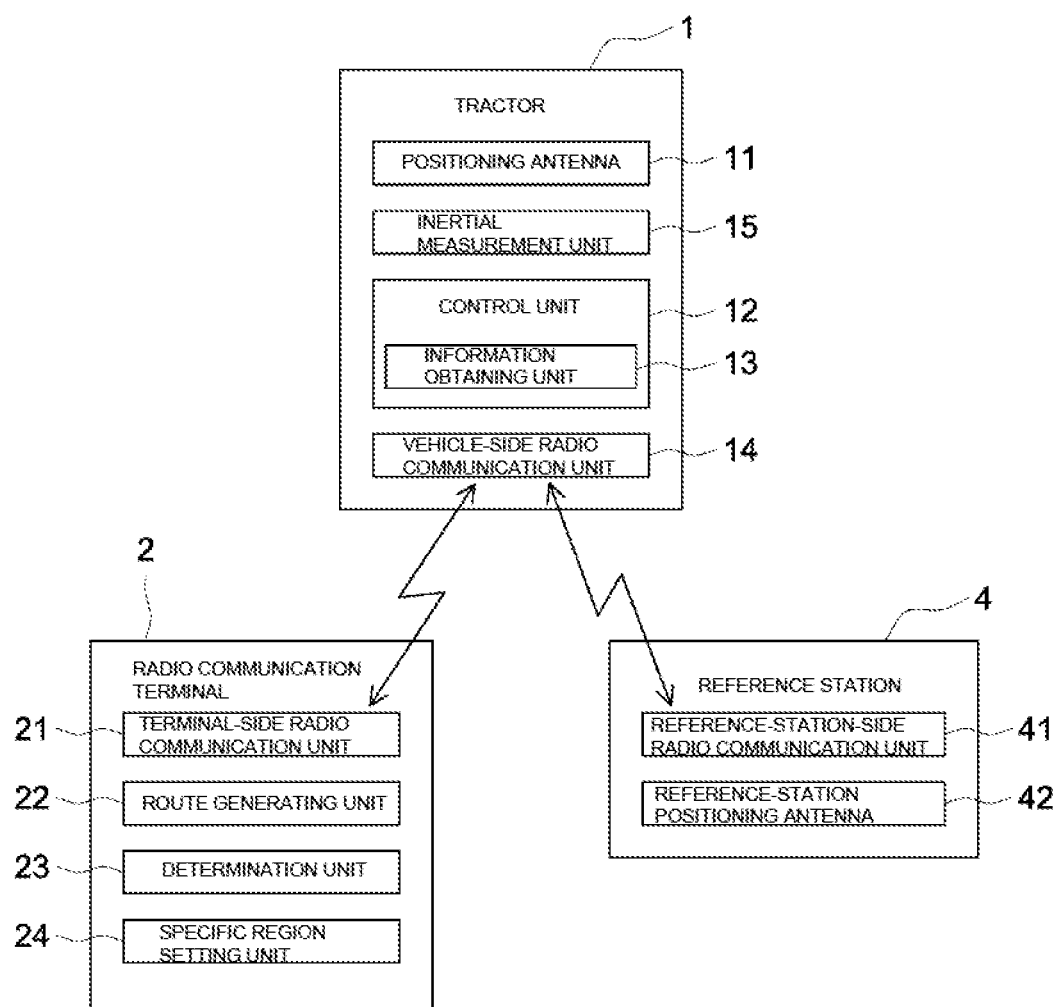
FIG. 2 A block diagram illustrating a schematic configuration of the autonomous travel system.

As illustrated in FIG. 2, the tractor 1 includes a vehicle-side radio communication unit 14, the radio communication terminal 2 includes a terminal-side radio communication unit 21, and the reference station 4 includes a reference-station-side radio communication unit 41. The tractor 1 and the radio communication terminal 2 are configured to be capable of exchanging various kinds of information with each other through radio communication between the vehicle-side radio communication unit 14 and the terminal-side radio communication unit 21, and the tractor 1 and the reference station 4 are configured to be capable of exchanging various kinds of information with each other through radio communication between the vehicle-side radio communication unit 14 and the reference-station-side radio communication unit 41. The radio communication terminal 2 and the reference station 4 are configured to be capable of exchanging various kinds of information with each other via the tractor 1. Alternatively, the radio communication terminal 2 and the reference station 4 may be configured to be capable of directly exchanging various kinds of information with each other not via the tractor 1 but through radio communication between the terminal-side radio communication unit 21 and the reference-station-side radio communication unit 41. These radio communication units may perform radio communication therebetween over a common frequency band or different frequency bands.

As illustrated in FIG. 2, the tractor 1 includes a positioning antenna 11, a vehicle-side control unit 12 (corresponding to a control unit), an information obtaining unit 13, the vehicle-side radio communication unit 14, and an inertial measurement unit 15 (e.g., a device including a three-axis gyro and three-direction acceleration sensor), for example.

The information obtaining unit 13 can obtain current position information on the tractor 1 based on, e.g., positioning information received by the positioning antenna 11. In addition, the information obtaining unit 13 can obtain posture information on the tractor 1 and orientation information as to a traveling direction of the tractor 1 based on, e.g., measurement information that the inertial measurement unit 15 has obtained as a result of measurement. The vehicle-side control unit 12 is configured to enable autonomous travel of the tractor 1 by controlling various devices included in the tractor 1, such as a speed governor, a transmission device, and a steering device (each not illustrated), while obtaining the current position information on itself (the current position of the tractor 1) via the information obtaining unit 13. The tractor 1 includes a memory unit (not illustrated), in which various kinds of information is stored.

As illustrated in FIG. 1, the positioning antenna 11 is configured to receive a signal from a positioning satellite 3 included in a satellite positioning system (GNSS), for example. The positioning antenna 11 is disposed on the top face of the roof provided on the cabin of the tractor 1, for example.

A positioning method involving use of the positioning system may be a positioning method of computing the current position of the tractor 1 by correcting satellite positioning information on the tractor 1 (mobile station) based on positioning correction information supplied from the reference station 4 installed at a predefined reference point, as illustrated in FIG. 1. For instance, any of various positioning methods such as differential GPS positioning (DGPS) and real time kinematic positioning (RKT positioning) may be adopted. Alternatively, the positioning method may be independent positioning without use of the reference station 4.

The present embodiment adopts RTK positioning, for example. Thus, as illustrated in FIGS. 1 and 2, the tractor 1, which is the mobile station, includes the positioning antenna 11, and the reference station 4 is provided. The position information on the reference point, at which the reference station 4 is installed, is preliminarily set and grasped. For example, the reference station 4 is positioned at a place (reference point) where the reference station 4 does not interfere with traveling of the tractor 1, e.g., an area surrounding a field. The reference station 4 includes the reference-station-side radio communication unit 41 and a reference-station positioning antenna 42.

In the RTK positioning, both of the reference station 4 installed at the reference point and the positioning antenna 11 of the tractor 1, which is the mobile station whose position information is to be obtained, measure the phases of the carrier waves (satellite positioning information) from the positioning satellite 3. Every time the reference station 4 obtains satellite positioning information from the positioning satellite 3 or every time a preset period has elapsed, the reference station 4 generates positioning correction information including, e.g., the satellite positioning information thus obtained and the position information on the reference point. Then, the reference station 4 transmits, via the reference-station-side radio communication unit 41, the positioning correction information to the vehicle-side radio communication unit 14 of the tractor 1. The information obtaining unit 13 of the tractor 1 corrects the satellite positioning information obtained by the positioning antenna 11 based on the positioning correction information supplied from the reference station 4, so as to yield the current position information on the tractor 1. As the current position information on the tractor 1, the information obtaining unit 13 computes latitude/longitude information, for example.

The radio communication terminal 2 is a tablet personal computer with a touch panel, for example. Various kinds of information can be displayed on the touch panel. In addition, operating the touch panel enables input of various kinds of information. The radio communication terminal 2 is usable either in a state where the user outside the tractor 1 carries the radio communication terminal 2 or in a state where the radio communication terminal 2 is attached to, e.g., the side of the driver seat of the tractor 1.

As illustrated in FIG. 2, the radio communication terminal 2 includes the terminal-side radio communication unit 21, a route generating unit 22, a determination unit 23, and a specific region setting unit 24, for example. The route generating unit 22 is configured to generate autonomous travel routes along which the tractor 1 is caused to perform autonomous travel. The radio communication terminal 2 includes a memory unit (not illustrated), in which various kinds of information such as information registered by the user is stored.

Figure 3:
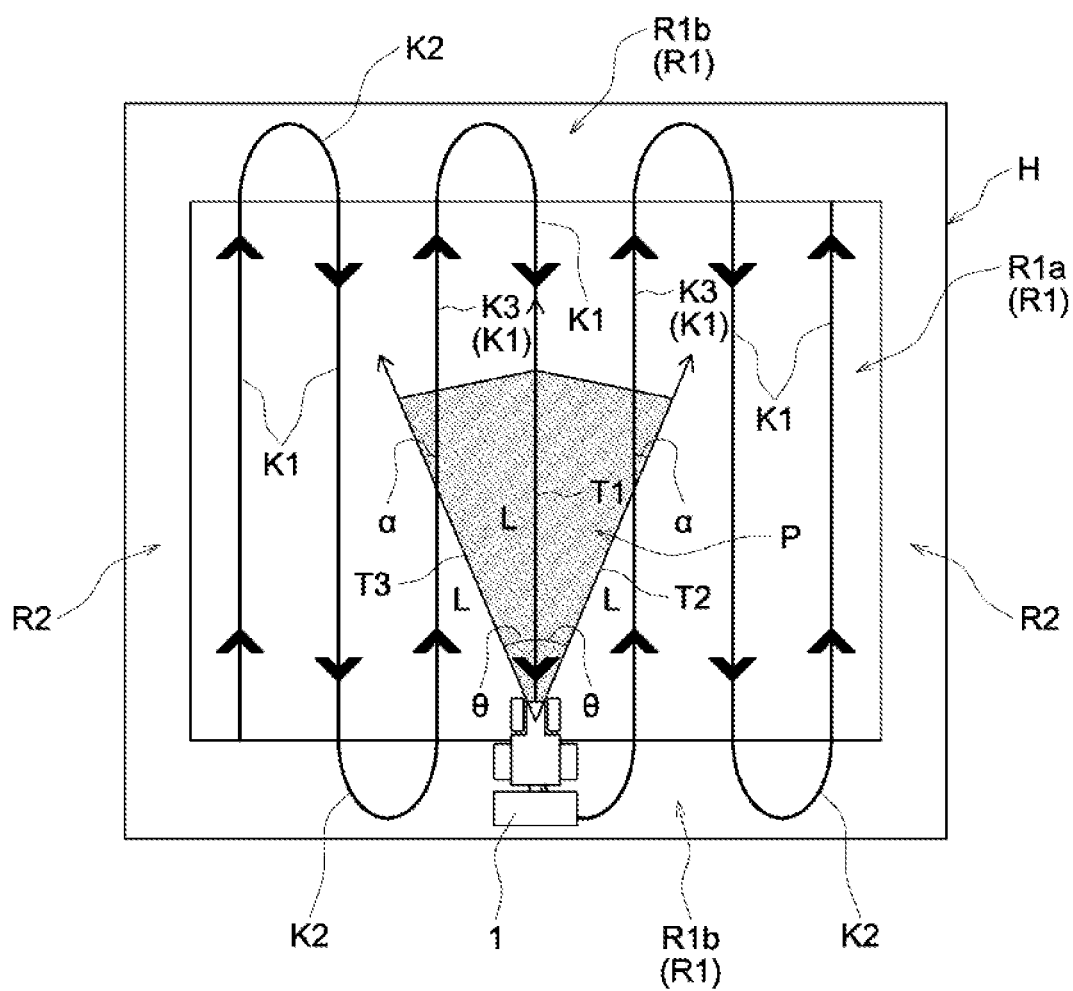
FIG. 3 A view showing one example of autonomous travel routes (planned travel routes).

The tractor 1 is caused to perform autonomous travel in the following manner. The user operates the touch panel and/or the like of the radio communication terminal 2 to enter various kinds of information. Based on the various kinds of information thus entered, the route generating unit 22 of the radio communication terminal 2 generates autonomous travel routes along which the tractor 1 is caused to perform autonomous travel. In order to generate each of the autonomous travel routes, the route generating unit 22 identifies various kinds of information regarding a travel route corresponding to the autonomous travel route, such as the start end, the terminal end, the forward direction, and the shape of the travel route. For example, as illustrated in FIG. 3, the route generating unit 22 generates work routes K1 and turning routes K2 as the autonomous travel routes. Along each of the work routes K1, the tractor 1 is caused to perform tilling and/or other work while performing autonomous travel. Along each of the turning routes K2, the tractor 1 is caused to make a turn from a corresponding one of the work routes K1 to a next one of the work routes K1. In addition, the autonomous travel routes K1 and K2 generated by the route generating unit 22 can be displayed on the touch panel of the radio communication terminal 2, as illustrated in FIG. 3. The autonomous travel routes in FIG. 3 are shown merely by way of example. The type of autonomous travel route to be generated by the route generating unit 22 may be changed as appropriate.

The route generating unit 22 generates the autonomous travel routes K1 and K2 in the following manner. First, as illustrated in FIG. 3, the specific region setting unit 24 sets a specific region H (e.g., a field) where the tractor 1 is caused to perform autonomous travel. The specific region H includes a first region R1 where the autonomous travel routes K1 and K2 are generated and a second region R2 where the autonomous travel routes K1 and K2 are not generated. The first region R1 includes a work region R1a where the tractor 1 performs the work and a non-work region R1b where the tractor 1 does not perform the work. The route generating unit 22 generates the work routes K1 in the work region R1a of the first region R1, whereas the route generating unit 22 generates the turning routes K2 in the non-work region R1b of the first region R1. The work routes K1 are each generated as a linear route along which the tractor 1 is caused to perform autonomous travel from a first end of the first region R1 to a second end of the first region R1, and are arranged side by side in the width direction of the specific region H (field) all over the first region R1. The turning routes K2 are generated in the first and second ends of the first region R1 such that each of the turning routes K2 connects ends of corresponding two of the work routes K1 arranged in the width direction of the specific region H (field) to allow the tractor 1 to make a turn therein.

As described above, the route generating unit 22 generates the autonomous travel routes K1 and K2. A single one of the work routes K1 may be selected as a start route, so as to start autonomous travel therein. Among the work routes K1, a work route K1 to be selected as the start route is not preliminarily set. Thus, after a single work route K1 is determined as the start route from among the work routes K1, autonomous travel is started. Of the autonomous travel routes K1 and K2, only the work route K1 may be determined as the start route.

Figure 4:
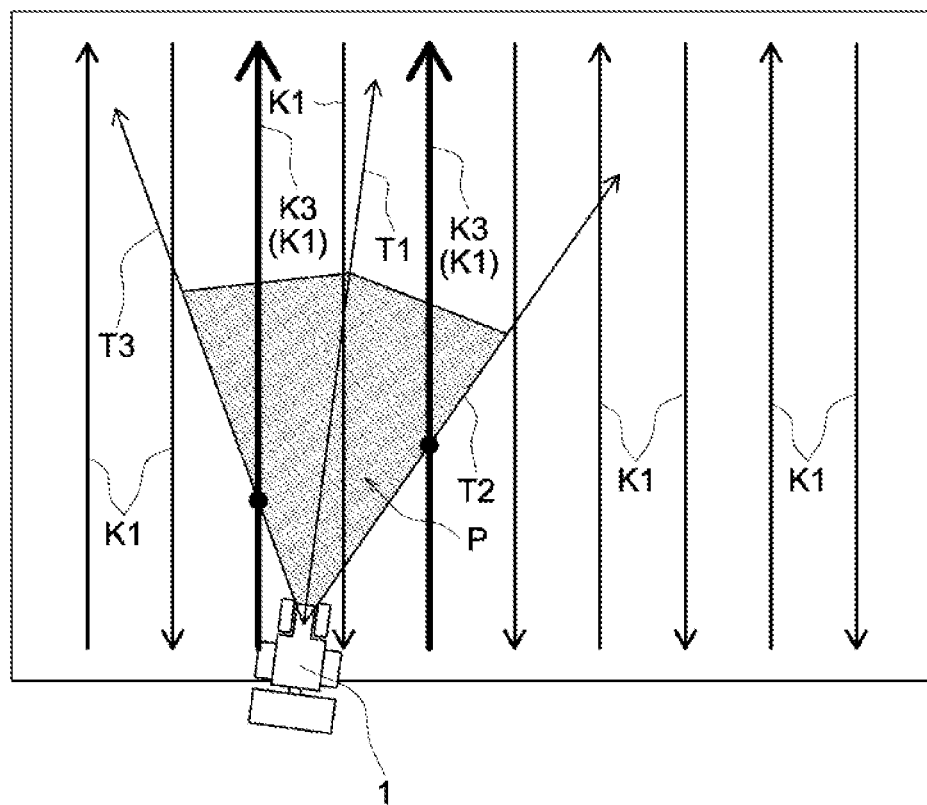
FIG. 4 A view schematically illustrating a state where determination on an autonomous travel candidate route is being performed.

The start route is determined in the following manner. Before the tractor 1 starts autonomous travel, the determination unit 23 first determines, among the work routes K1, an autonomous travel candidate route at which the tractor 1 can start autonomous travel. As illustrated in FIGS. 3 and 4, the determination unit 23 sets a candidate determination region P based on the position information and the orientation information on the tractor 1. Then, the determination unit 23 determines, as an autonomous travel candidate route K3, a work route K1 whose forward direction coincides with the traveling direction of the tractor 1 and which is included in the candidate determination region P, from among the work routes K1.

The following will describe how to set the candidate determination region P. Assume that a traveling straight-line T1 extends in the traveling direction of the tractor 1 as illustrated in FIG. 3. Then, turning the traveling straight-line T1 to the right by a turning angle θ about the current position of the tractor 1 yields a right straight-line T2, whereas turning the traveling straight-line T1 to the left by the turning angle θ about the current position of the tractor 1 yields a left straight-line T3. A region that is sandwiched between the right straight-line T2 and the left straight-line T3 and extends from the current position of the tractor 1 by a preset distance L is set as the candidate determination region P. In this manner, the candidate determination region P, which is shaped in a quadrangle extending from the current position of the tractor 1 in the traveling direction of the tractor 1, is set. The shape of the candidate determination region P is not limited to a quadrangle as those described above. Alternatively, for example, the shape of the candidate determination region P may be selected from various shapes such as a triangle and an arch. In addition, in accordance with various conditions, the candidate determination region P may be set so that the candidate determination region P does not include a region residing in a direction opposite to the traveling direction of the tractor 1. As the candidate determination region P, a certain region may be fixedly set. Alternatively, the region to be set as the candidate determination region P may be changed depending on the state of the tractor 1, such as the current position of the tractor 1.

The determination unit 23 determines, as an autonomous travel candidate route K3, a work route K1 whose forward direction coincides with the traveling direction of the tractor 1 and which is included in the candidate determination region P. Thus, in a case where multiple (e.g., two) work routes K1 whose forward directions coincide with the traveling direction of the tractor 1 are included in the candidate determination region P as illustrated in FIGS. 3 and 4, the determination unit 23 determines these work routes K1 as autonomous travel candidate routes K3. The autonomous travel candidate routes K3 determined by the determination unit 23 can be displayed on the touch panel of the radio communication terminal 2 in such a manner that the work routes K1 having been determined as the autonomous travel candidate routes K3 can be distinguished from the others, as indicated by the bold lines in FIG. 4.

Figure 5:
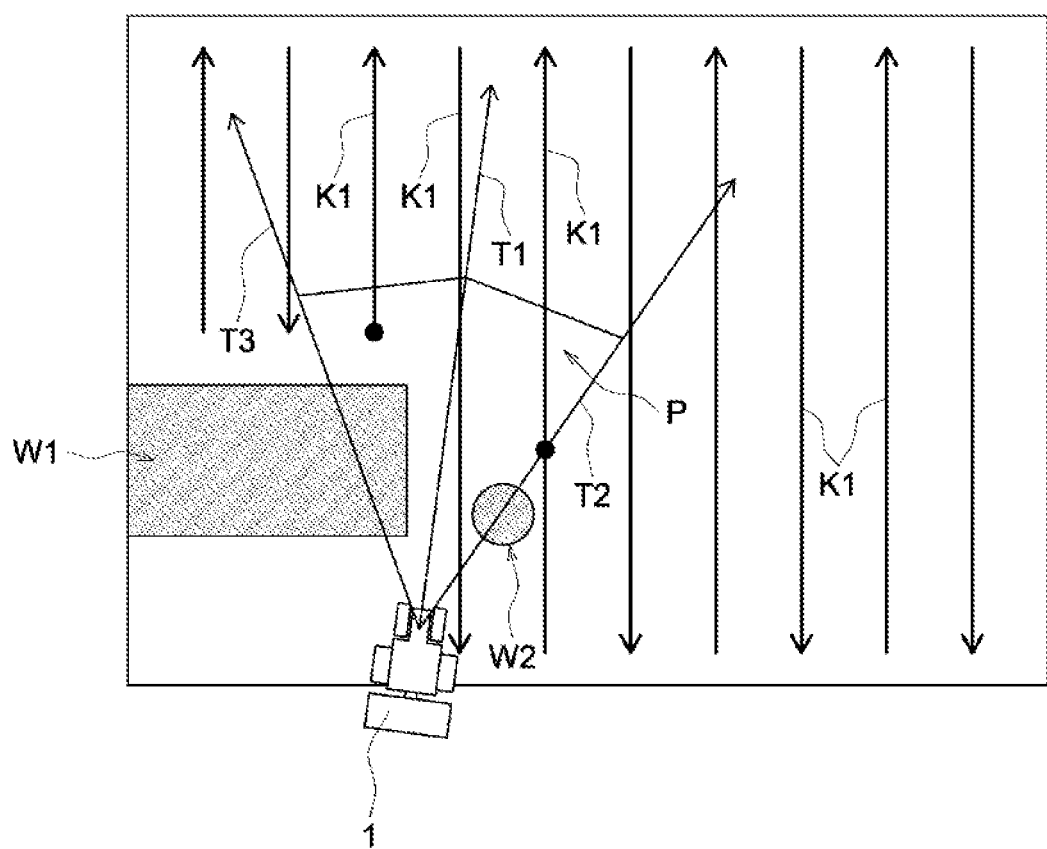
FIG. 5 A view schematically illustrating a state where determination on an autonomous travel candidate route is being performed.

The determination unit 23 does not necessarily determine, as an autonomous travel candidate route K3, any work route K1 whose forward direction coincides with the traveling direction of the tractor 1 and which is included in the candidate determination region P. Specifically, the determination unit 23 does not determine, as an autonomous travel candidate route K3, a work route K1 meeting any of exclusion conditions as illustrated in FIG. 5, even if the work route K1 has the forward direction coinciding with the traveling direction of the tractor 1 and is included in the candidate determination region P. The exclusion conditions are described in (1) to (4) below. FIG. 5 shows a case that meets the following exclusion condition (1).

(1) An exclusion condition applies to a work route K1 whose start end is apart from the current position of the tractor 1 across an out-of-field region W1 (i.e., a region W1 outside the field), as illustrated in FIG. 5. Also, assume that there exists a work route K1 intersecting the right straight-line T2 or the left straight-line T3 of the candidate determination region P as illustrated in FIG. 5. Then, if the intersection of the work route K1 and the right straight-line T2 or the left straight-line T3 is apart from the current position of the tractor 1 across an obstacle W2, the work route K1 meets the exclusion condition. In the example shown in FIG. 5, the third work route K1 from the left is included in the candidate determination region P. However, this work route K1 has the start end that is apart from the current position of the tractor 1 across the out-of-field region W1. Meanwhile, in the example shown in FIG. 5, although the fifth work route K1 from the left intersects the right straight-line T2, the intersection is apart from the current position of the tractor 1 across the obstacle W2.

(2) An exclusion condition applies to a work route K1 having a low priority order that is determined based on the distance from the current position of the tractor 1 to the start position of the work route K1 or to the intersection of the work route K1 and the right straight-line T2 or the left straight-line T3. The priority order is set in the following manner. A higher priority order is given to a work route K having a shorter distance from the current position of the tractor 1 to the start position of the work route K1 or to the intersection of the work route K1 and the right straight-line T2 or the left straight-line T3. This is repeatedly performed until the number of work routes K1 given higher priority orders reaches the upper limit. Meanwhile, a lower priority order(s) is given to a work route(s) K1 beyond the upper limit.

(3) An exclusion condition applies to a work route K1 whose intersection with the right straight-line T2 or the left straight-line T3 is away from the current position of the tractor 1 by a distance greater than a maximum preset distance. Alternatively, this exclusion condition may apply to a work route K1 whose start position is away from the current position of the tractor 1 by a distance greater than a maximum preset distance.

Figure 6:
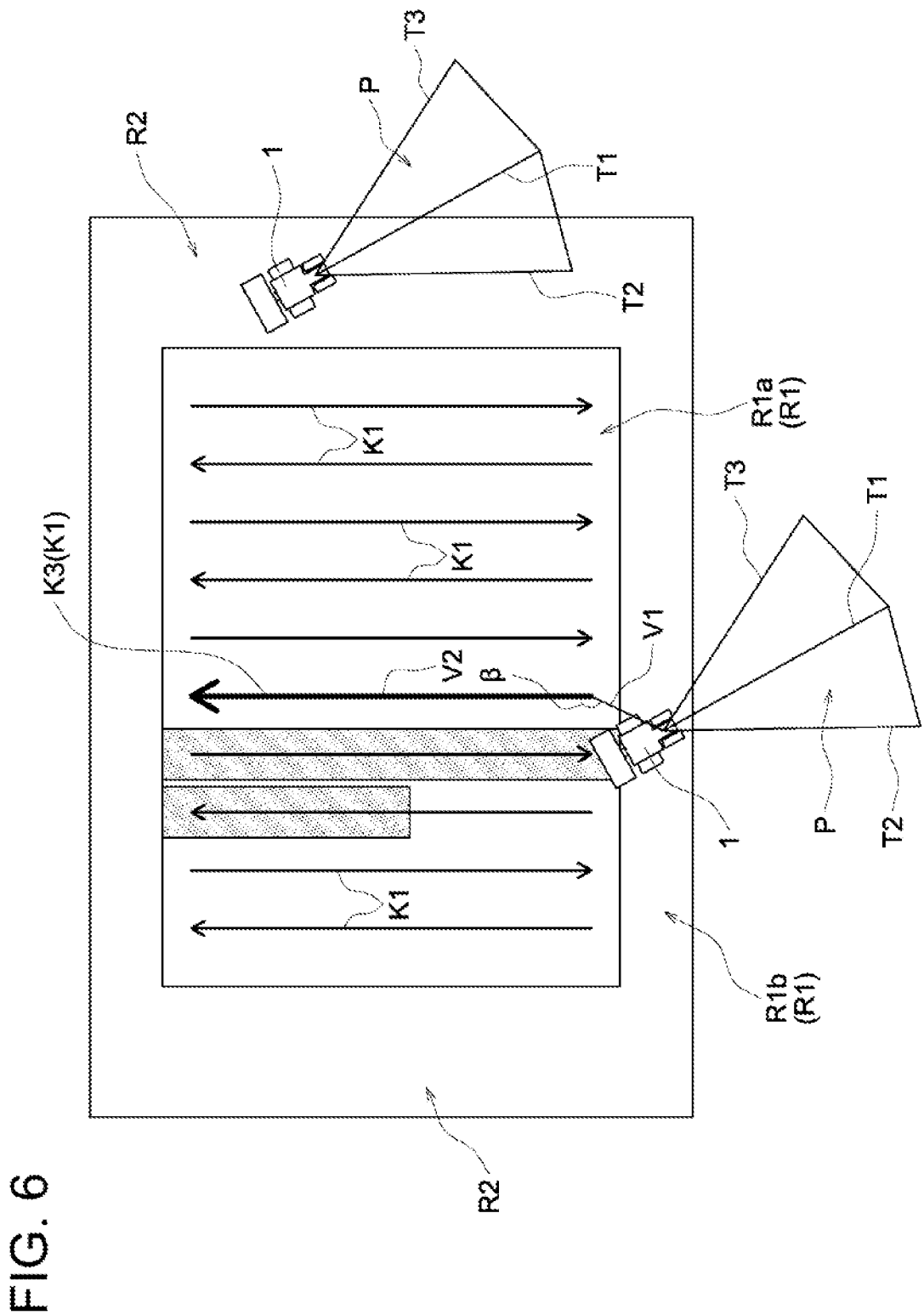
FIG. 6 A view schematically illustrating a state where determination on an autonomous travel candidate route is being performed.

(4) An exclusion condition applies to a work route K1 on which work and autonomous travel have been done. As illustrated in the gray area in FIG. 6, the radio communication terminal 2 grasps on which one(s) of the work routes K1 work has been done. In addition, as illustrated in FIG. 6, the radio communication terminal 2 is configured to be capable of displaying, on the touch panel, the work routes K1 such that the work route(s) K1 on which work has been done can be distinguished from the others, e.g., by painting out of the work route(s) K1 on which work has been done.

The exclusion conditions can be set as appropriate. For example, among exclusion conditions (1) to (4), one or more conditions may be selected. An exclusion condition other than exclusion conditions (1) to (4) above may be set. For example, an exclusion condition may be set that applies to a work route K1 whose angle α made by the right straight-line T2 or the left straight-line T3 and a straight line V2 (corresponding to a second straight line) extending along the work route K1 exceeds a predetermined angle, as illustrated in FIG. 3. Here, the predetermined angle may be an angle smaller than the turning angle θ, based on which the right straight-line T2 and the left straight-line T3 are set, for example.

There may be a case where the plurality of work routes K1 does not include a work route K1 whose forward direction coincides with the traveling direction of the tractor 1 and which is included in the candidate determination region P. In such a case, as illustrate in FIG. 6, the determination unit 23 determines whether or not each of the work routes K1 is suitable as an autonomous travel candidate route K3 based on an angle β made by a first straight line V1 and a second straight line V2, the first straight line V1 being defined by the position information on the tractor 1 (the position information on the tractor 1 located on the left side in FIG. 6) and by the information on the start end of the work route K1, the second straight line V2 extending along the work route K1. If there exists a work route K1 whose angle β made by a first straight line V1 and a second straight line V2 exceeds a predetermined angle (e.g., 90 degrees), the determination unit 23 determines the work route K1 as an autonomous travel candidate route K3.

As described above, in a case where the tractor 1 is located in the first region R1 (see FIGS. 3 and 4), the determination unit 23 performs, continuously for a predetermined period of time, a normal determination process of performing the determination on the autonomous travel candidate route K3 based on the candidate determination region P. During the normal determination process, if there exists a work route K1 whose forward direction coincides with the traveling direction of the tractor 1, which is included in the candidate determination region P, and which does not meet any of the exclusion conditions, the determination unit 23 determines the work route K1 as an autonomous travel candidate route K3. Meanwhile, if a work route K1 included in the candidate determination region P is not found from among the work routes K1 whose forward directions coincide with the traveling direction of the tractor 1 even after the normal determination process has been performed continuously for the predetermined period of time, the determination unit 23 performs a start-end determination process of performing the determination on the autonomous travel candidate route K3 based on the angle β made by the first straight line V1 and the second straight line V2, as illustrated in FIG. 6. During the start-end determination process, if there exists a work route K1 whose angle β made by a first straight line V1 and a second straight line V2 exceeds a predetermined angle (e.g., 90 degrees), the determination unit 23 determines the work route K1 as an autonomous travel candidate route K3.

The case where the determination unit 23 performs the start-end determination process is not limited to the case where a work route K1 included in the candidate determination region P is not found from among the work routes K1 whose forward directions coincide with the traveling direction of the tractor 1 even after the normal determination process has been performed. For example, also in a case where the tractor 1 is located in the non-work region R1b where a plurality of turning routes K2 are generated, the determination unit 23 may perform the start-end determination process. In this manner, depending on a part of the field H in which the current position of the tractor 1 resides, the determination unit 23 may perform the start-end determination process.

In a case where the tractor 1 is located in the second region R2 as exemplified by the tractor 1 illustrated on the right side of FIG. 6, the determination unit 23 does not perform the determination on the autonomous travel candidate route K3 based on the angle β made by the first straight line V1 and the second straight line V2, but still performs the determination on the autonomous travel candidate route K3 based on the candidate determination region P. Thus, in a case where the tractor 1 is located in the second region R2, the determination unit 23 performs only the normal determination process. The normal determination process will be continuously performed until a work route K1 whose forward direction coincides with the traveling direction of the tractor 1, which is included in the candidate determination region P, and which does not meet any of the exclusion conditions is found.

When the determination unit 23 determines the autonomous travel candidate route K3 as a result of the above-described process, the radio communication terminal 2 transmits, to the tractor 1, candidate route information on the autonomous travel candidate route K3 determined by the determination unit 23. Upon reception of the candidate route information transmitted from the radio communication terminal 2, the vehicle-side control unit 12 of the tractor 1 determines whether or not an autonomous travel initiation condition is satisfied. If four conditions (1), (2), (3) or (4), and (5) among the conditions (1) to (5) described below are satisfied, the vehicle-side control unit 12 determines that the autonomous travel initiation condition is satisfied, and determines, among the autonomous travel candidate routes K3, a start route to start autonomous travel. Incidentally, the conditions (1), (2), and (5) are conditions for determining the start route from among the autonomous travel candidate routes K3. Thus, in a case where multiple autonomous travel candidate routes K3 exist, a single autonomous travel candidate route K3 serving as the start route will be determined from among the multiple autonomous travel candidate routes K3.

(1) A lateral deviation between the current position of the tractor 1 and the autonomous travel candidate route K3 is within a predetermined distance (e.g., ±100 cm).

(2) A deviation in orientation between the traveling direction of the tractor 1 and the autonomous travel candidate route K3 is within a predetermined angle (e.g., ±15 degrees).

(3) In a case where the current position of the tractor 1 is located in the work region R1a (see FIG. 3), a distance from the current position of the tractor 1 to the non-work region R1b (see FIG. 3) is equal to or longer than a predetermined distance (e.g., 10 m).

(4) In a case where the current position of the tractor 1 is located in the non-work region R1b (see FIG. 3), a distance from the current position of the tractor 1 to the work region R1a (see FIG. 3) is equal to or shorter than a predetermined distance (e.g., 5 m).

(5) A state where a single autonomous travel candidate route K3 satisfies the above conditions (1) and (2) continues for a predetermined period of time (e.g., one second).

Upon satisfaction of the autonomous travel initiation condition, the vehicle-side control unit 12 transmits, to the radio communication terminal 2, autonomous travel permission information indicating a certain route having been set as the start route to start autonomous travel. In response to this, the radio communication terminal 2 displays, on the touch panel, the certain route having been set as the start route, in such a manner that the certain route can be distinguished from the other autonomous travel candidate routes K3. Consequently, the radio communication terminal 2 enters a state where the user is allowed to give an instruction to start autonomous travel.

The radio communication terminal 2 operates as follows. That is, when the user operates the touch panel to give an instruction to start autonomous travel, the radio communication terminal 2 transmits to the tractor 1 the instruction to start autonomous travel. In response to this, the tractor 1 operates as follows. That is, when the vehicle-side control unit 12 receives the instruction to start autonomous travel, the tractor 1 starts autonomous travel along the start route, while obtaining the current position information on itself (the current position of the tractor 1) via the information obtaining unit 13.

In order to start autonomous travel, the vehicle-side control unit 12 needs to obtain the start route information on the start route in advance. The following will describe how to obtain the start route information.

Before the vehicle-side control unit 12 determines whether or not the autonomous travel initiation condition is satisfied, the vehicle-side control unit 12 obtains the candidate route information from the radio communication terminal 2. The start route to start autonomous travel is determined from among the autonomous travel candidate routes K3. This means that the candidate route information includes the start route information on the start route to start autonomous travel. That is to say, for the vehicle-side control unit 12, obtaining the candidate route information means obtaining the start route information. Thus, the vehicle-side control unit 12 of the tractor 1 can obtain the start route information, even without the radio communication terminal 2 transmitting the start route information to the tractor 1.

Alternatively, the vehicle-side control unit 12 can obtain the start route information that the radio communication terminal 2 has transmitted to the tractor 1. Specifically, since the vehicle-side control unit 12 can identify, based on the autonomous travel permission information, an autonomous travel candidate routes K3 having been set as the start route to start autonomous travel, the radio communication terminal 2 can transmit the start route information to the tractor 1, so that the vehicle-side control unit 12 can obtain the start route information.

In the above-described manner, after autonomous travel is started, the radio communication terminal 2 transmits the route information on the autonomous travel route to the tractor 1 in response to a request from the tractor 1. Consequently, the vehicle-side control unit 12 can obtain the route information on the autonomous travel route along which the tractor 1 performs autonomous travel. Thus, based on the route information, the vehicle-side control unit 12 causes the tractor 1 to perform autonomous travel along the autonomous travel route, while obtaining the current position information on itself (the current position of the tractor 1) via the information obtaining unit 13.

OTHER EMBODIMENTS (1) In the embodiment described above, in a case where the tractor 1 is located in the first region R1, the determination unit 23 operates as follows. That is, if the plurality of work routes does not include a work route K1 included in the candidate determination region P, the determination unit 23 performs the determination on the autonomous travel candidate route K3 based on the angle β made by the first straight line V1 and the second straight line V2. Alternatively, similarly to the case where the tractor 1 is located in the second region R2, the determination unit 23 may not perform the determination on the autonomous travel candidate route K3 based on the angle β made by the first straight line V1 and the second straight line V2, but may still perform the determination on the autonomous travel candidate route K3 based on the candidate determination region P.

(2) In the example shown in the embodiment described above, the radio communication terminal 2 includes the route generating unit 22, the determination unit 23, and the specific region setting unit 24. Alternatively, for example, the vehicle-side control unit 12 of the tractor 1 may include the route generating unit 22, the determination unit 23, and the specific region setting unit 24. Further alternatively, an external management device or the like may include the route generating unit 22, the determination unit 23, and the specific region setting unit 24. Thus, a device to include the route generating unit 22, the determination unit 23, and the specific region setting unit 24 may be changed as appropriate.

INDUSTRIAL APPLICABILITY

The present invention is applicable to various travel route determination systems for determining a planned travel route at which a work vehicle starts autonomous travel, in a case where the work vehicle is caused to perform autonomous travel.

REFERENCE SIGNS LIST

1 tractor (work vehicle)
12 vehicle-side control unit (control unit)
13 information obtaining unit
14 vehicle-side radio communication unit
22 route generating unit
23 determination unit
24 specific region setting unit
H specific region (field)
K1 work route (planned travel route)
K2 turning route (planned travel route)
K3 autonomous travel candidate route
R1 first region
R2 second region
P candidate determination region
V1 first straight line
V2 second straight line
β angle made by first straight line and second straight line

The invention claimed is:
1. A travel route determination method, comprising:
generating a set of planned travel routes including a plurality of work routes for autonomous travel of a work vehicle, the plurality of work routes comprising a first start route and a second start route different from the first start route;
making the work vehicle autonomously travel along each of the planned travel routes, wherein a current start route for the autonomous travel is set to the first start route; and before the work vehicle starts the autonomous travel, changing the current start route for the autonomous travel for the work vehicle to start autonomous travel at the second start route.

2. The travel route determination method according to claim 1, further comprising:
displaying the plurality of work routes on a display unit in a manner that allows identification of the current start route.

3. The travel route identification method according to claim 1, further comprising:
displaying a positional relationship between the current start route and the work vehicle on a display unit based on position information and direction information of the work vehicle.

4. The travel route identification method according to claim 2, further comprising:
displaying a positional relationship between the current start route and the work vehicle on the display unit based on position information and direction information of the work vehicle.

* * * * *